United States Patent
Aslakson

(12) 
(10) Patent No.: US 6,234,409 B1
(45) Date of Patent: May 22, 2001

(54) TRAILER MOUNTED GRAFFITI REMOVAL SYSTEM

(75) Inventor: Kurt Aslakson, Chaska, MN (US)

(73) Assignee: Graffiti Gone Inc., Chaska, MN (US)

( * ) Notice: Subject to any disclaimer, the term of this patent is extended or adjusted under 35 U.S.C. 154(b) by 0 days.

(21) Appl. No.: 09/569,226

(22) Filed: May 11, 2000

Related U.S. Application Data

(63) Continuation of application No. 08/822,430, filed on Mar. 21, 1997, now Pat. No. 6,082,631.

(51) Int. Cl.[7] .............................. A01G 25/09; B05B 09/03
(52) U.S. Cl. .................... 239/172; 239/146; 239/148; 239/195; 239/407; 239/289; 280/422; 280/789
(58) Field of Search ........................................ 239/146, 148, 239/172, 175, 127, 195, 197, 289, 302, 304, 310, 303, 332, 407, 413, 124, 526; 280/422, 789; 134/172, 173

(56) References Cited

U.S. PATENT DOCUMENTS

| | | |
|---|---|---|
| 1,611,730 | 12/1926 | Epps . |
| 1,747,793 | 2/1930 | Pounds et al. . |
| 2,367,032 | 1/1945 | La Bour . |
| 2,935,818 | 5/1960 | Crane . |
| 3,140,050 | 7/1964 | Elmore . |
| 3,219,257 | 11/1965 | Green . |
| 3,380,658 | 4/1968 | Stasz et al. . |
| 3,504,858 | 4/1970 | Liddiard . |
| 3,589,614 | 6/1971 | Linville . |
| 3,680,786 | 8/1972 | Levy . |
| 3,770,060 | 11/1973 | Forsyth et al. . |
| 3,797,744 | 3/1974 | Smith . |
| 3,831,849 | 8/1974 | Studinger . |
| 3,888,532 | 6/1975 | Link . |
| 3,997,114 | 12/1976 | Hewett . |
| 4,213,798 | 7/1980 | Schafer . |
| 4,311,274 | 1/1982 | Neal . |
| 4,352,463 | * 10/1982 | Baker ............................... 293/197 X |
| 4,372,568 | 2/1983 | Campbell . |
| 4,821,958 | 4/1989 | Shaffer . |
| 5,421,612 | 6/1995 | Floe . |
| 5,443,131 | 8/1995 | Bartlett . |
| 5,468,008 | 11/1995 | Hecht . |
| 5,533,671 | 7/1996 | Baer . |
| 5,601,659 | 2/1997 | Rohrbacher . |
| 6,082,631 | * 7/2000 | Aslakson ............................... 239/172 |

FOREIGN PATENT DOCUMENTS

| | | |
|---|---|---|
| 92 08 006 | 12/1992 | (DE) . |
| 2149077 | 3/1973 | (FR) . |
| 2200818 | 4/1974 | (FR) . |

* cited by examiner

Primary Examiner—David A. Scherbel
Assistant Examiner—Steven J. Ganey
(74) Attorney, Agent, or Firm—Merchant & Gould P.C.

(57) ABSTRACT

A transportable, trailer-mounted system for removing graffiti from exterior and interior surfaces is disclosed. The system includes a water supply tank, a pressure washer, provision for applying cleaning chemicals to surfaces, storage areas for cleaning chemicals, sandblasting apparatus, and painting apparatus. Also included are sources of electrical power, air compressor, painting equipment and surface preparation tools. Using the system enables the cleaning and restoration of graffiti-damaged surfaces in the minimum possible amount of time after the graffiti is applied. It is generally agreed that the prompt removal of graffiti reduces the incidence of graffiti application and that graffiti is more easily removed if removal is accomplished soon after it has been applied.

8 Claims, 5 Drawing Sheets

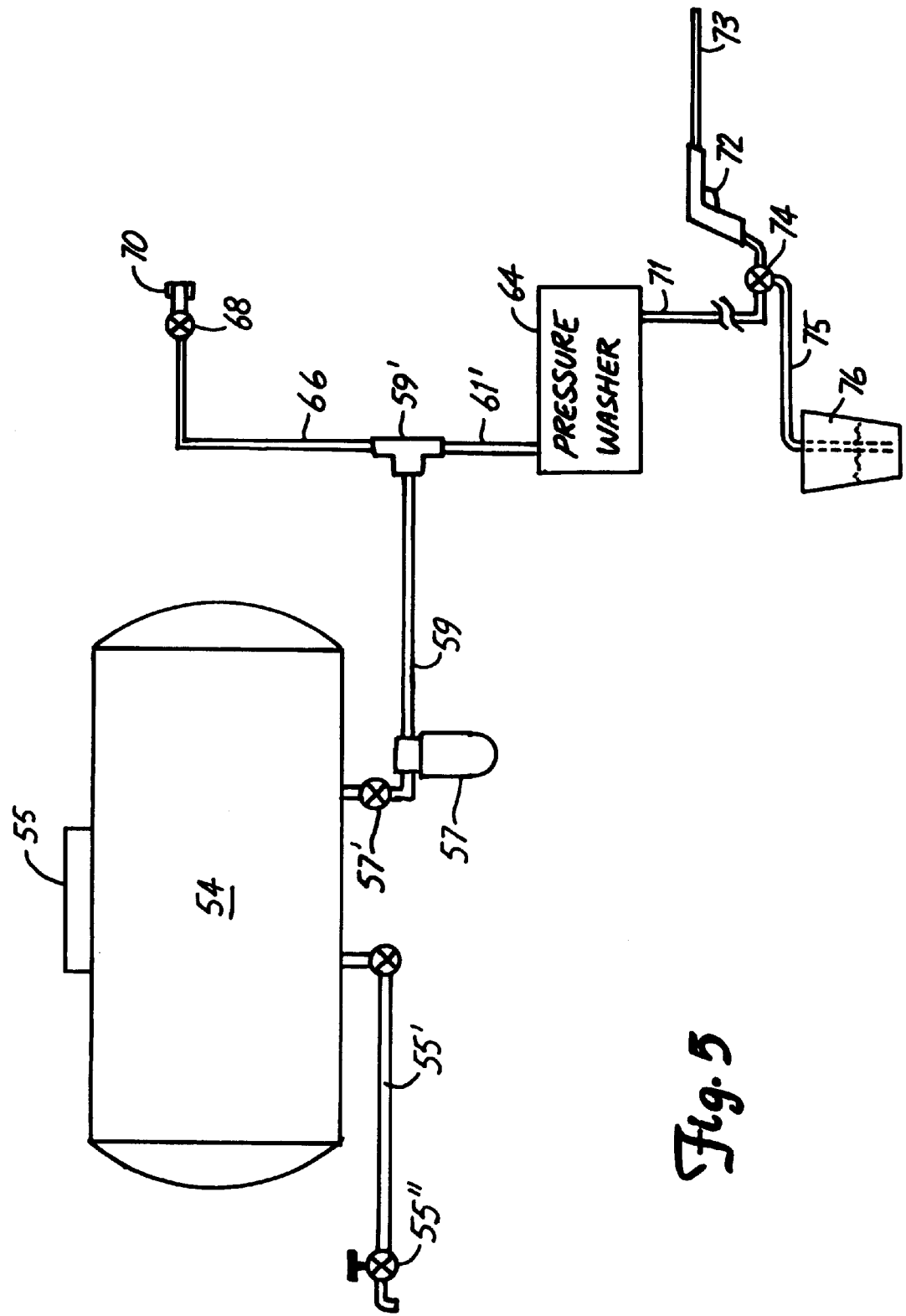

TRAILER MOUNTED GRAFFITI REMOVAL SYSTEM

This application is a Continuation of application Ser. No. 08/822,430, filed Mar. 21, 1997, now U.S. Pat. No. 6,082,631, which application(s) are incorporated herein by reference.

BACKGROUND OF THE INVENTION

This invention relates generally to the removal of graffiti and more specifically to an integrated portable system for the removal of graffiti in remote locations, away from convenient sources of water and electric power. In the preferred embodiment of the system the integrated system is trailer mounted for convenient transport to the site where the graffiti has been applied.

While the invention generally relates to apparatus and methods for removal of graffiti, in its trailer mounted embodiment it more specifically relates to various trailer and system features that cooperate to facilitate operation to remove graffiti in remote, field conditions.

The system includes provision for pressure washing, sandblasting, repainting and other steps in the restoration of large graffiti defaced objects such as buildings and monuments.

Examples of mobile pressure cleaning units are shown in Shaffer U.S. Pat. Nos. 4,213,796 and 4,821,958 which are truck mounted cleaning units which provide only high pressure cleaning and rinsing operations. Similarly Stasz U.S. Pat. No. 3,380,658 is also a truck mounted power washing apparatus while Elmore U.S. Pat. No. 3,140,050 is apparently a cart mounted apparatus for cleaning barns and stables.

None of the existing systems are integrated portable systems suitable for the complete graffiti removal and surface restoration of large surfaces under remote, field conditions.

It is an object of the present invention to provide an integrated portable graffiti removal and surface restoration system for treating surfaces under remove field conditions.

The object above may be attained in a trailer mounted system for graffiti removal and surface restoration where the system comprises a trailer frame,
a fluid storage tank mounted on the trailer frame and
a plurality of cabinets mounted on the trailer frame, where certain of the cabinets are constructed and arranged for mounting graffiti removal and surface restoration equipment and others of the cabinets are adapted for transporting and powering portable graffiti removal and surface restoration equipment.

BRIEF DESCRIPTION OF THE DRAWINGS

FIG. 5 is a hybrid schematic and pictorial representation of the fluid transfer system used in the integrated portable graffiti removal system.

DETAILED DESCRIPTION OF THE INVENTION

Figure 1:
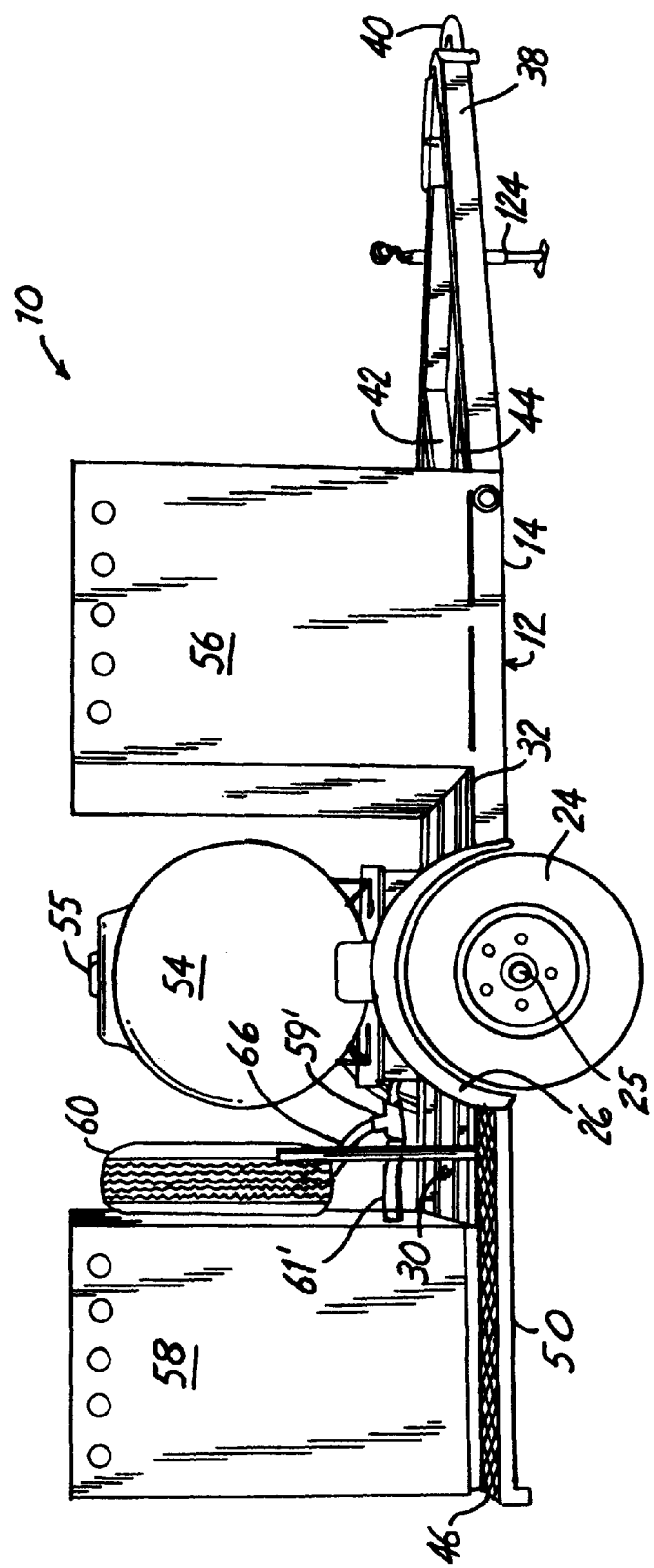
FIG. 1 is a side elevation view of a preferred embodiment of an integrated portable graffiti removal system in accordance with the present invention.

The various aspects of the present invention are all related to improvements in integrated portable graffiti removal systems, a preferred embodiment of which is shown as 10 of FIG. 1. The graffiti removal system 10 comprises an integrated portable system for the restoration of graffiti defaced surfaces.

Figure 4:
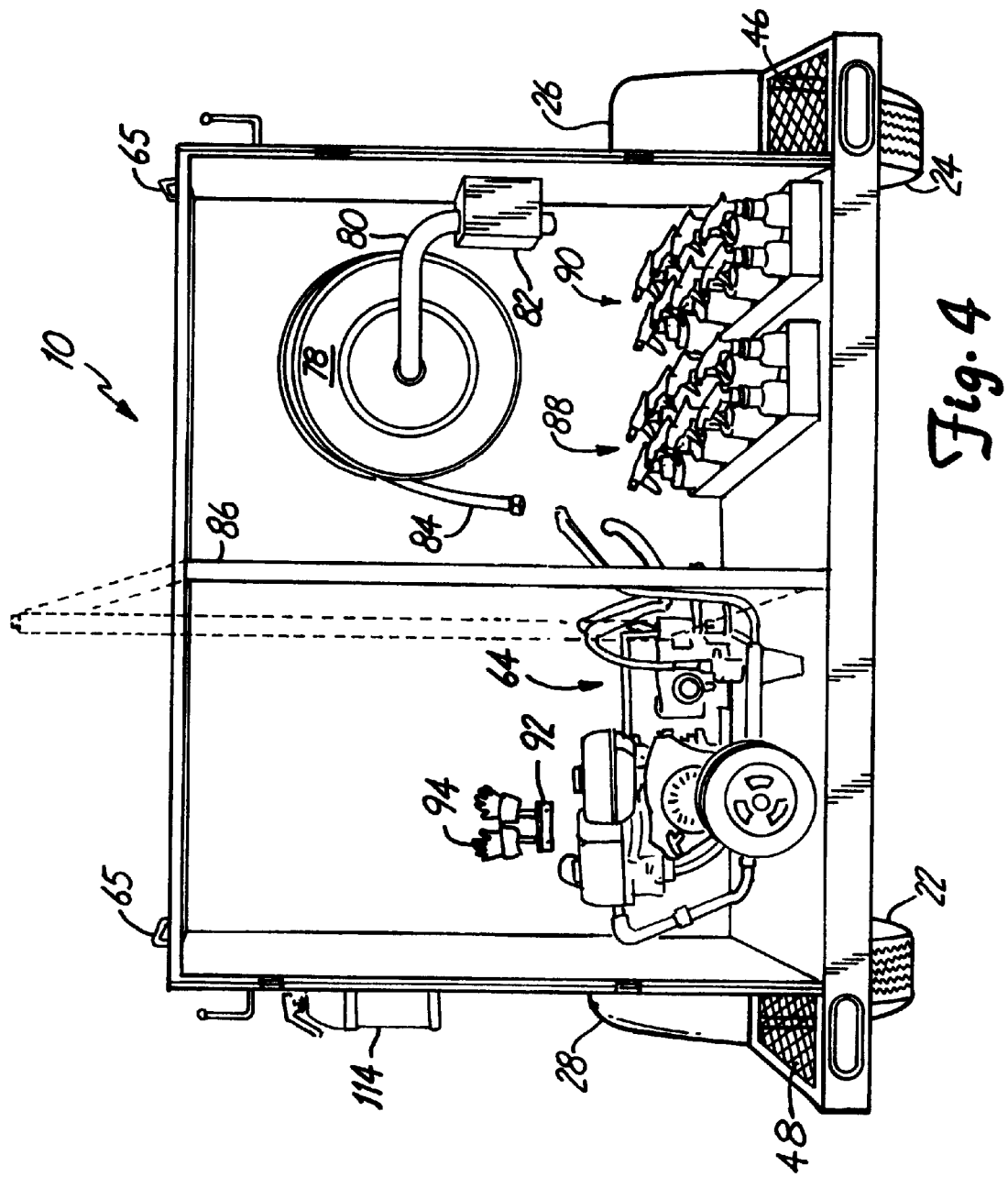
FIG. 4 is a rear elevation view of the graffiti removal system of FIG. 1 with the cabinet doors shown fully opened.

In order to accomplish the desired graffiti restoration process, the system shown in FIGS. 1–5 includes a specially designed trailer frame 12, which in the preferred embodiment may have a length of approximately 16 feet. Frame 12 comprises a rectangular base frame having exterior longitudinal frame members 14 and 16, portions of which may best be seen in the top plan view in FIG. 2. The rectangular frame 12 is completed by a front transverse member 18 and a rear transverse member 20. All of the members of the frame in the preferred embodiment are box frame rather than material having a c-shaped cross section. As can be seen, the rear transverse member 20 is substantially wider than the remainder of frame 12. As shown in FIG. 4, the elongated rear transverse box beam member 20 extends to the full width of the trailer frame 12 and wheels 22 and 24 which are mounted on axle 25 (in FIG. 1) which is in turn mounted on frame 12. Axle 25 may be a 5200 pound axle with electric break away brakes (not shown).

Wheels 22 and 24 are protected by fenders 26 and 28 which are securely attached to longitudinal frame members 14 and 16 respectively using fender support brackets 29.

Figure 2:
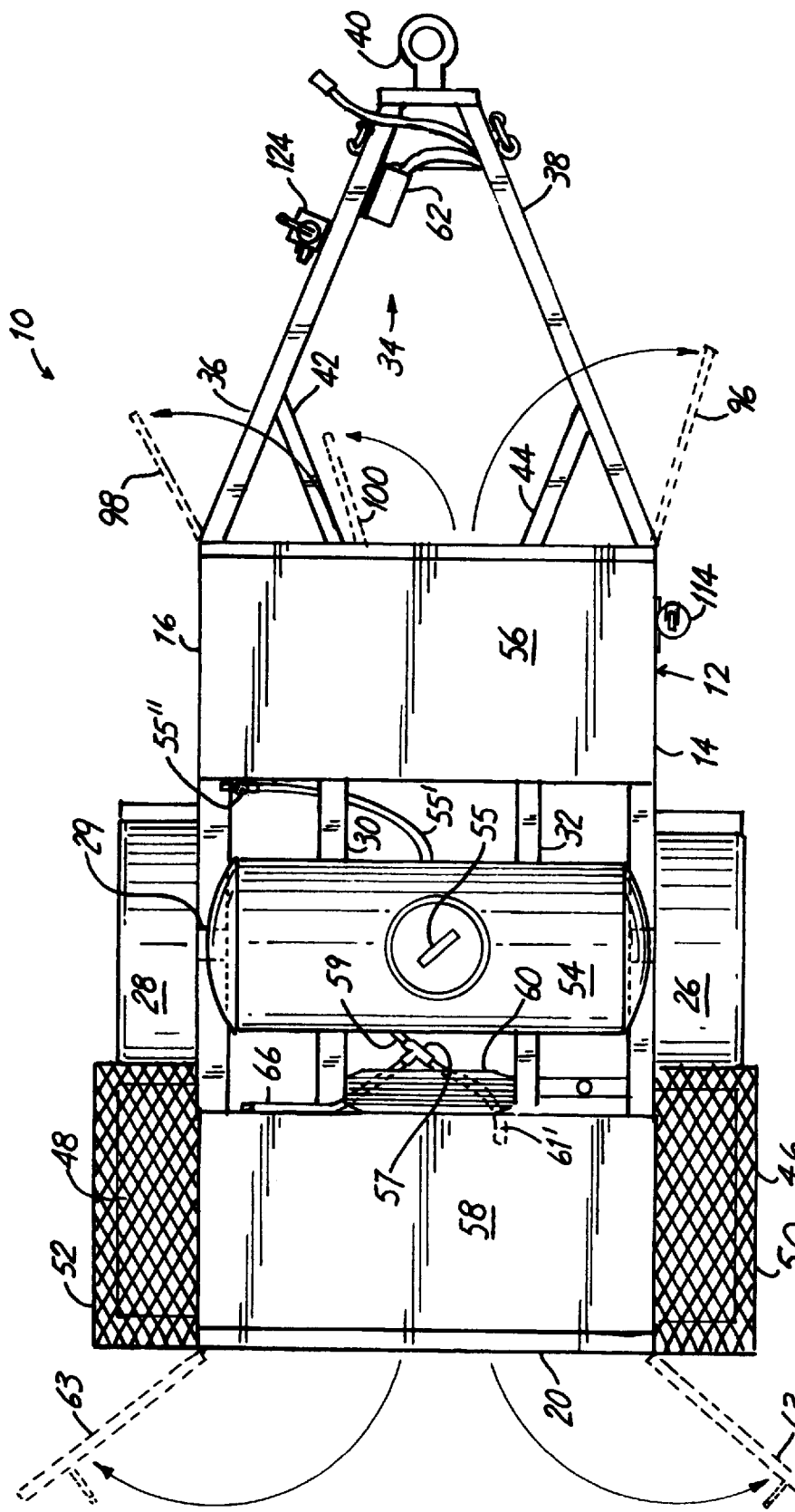
FIG. 2 is a top plan view of the system of FIG. 1.
Figure 3:
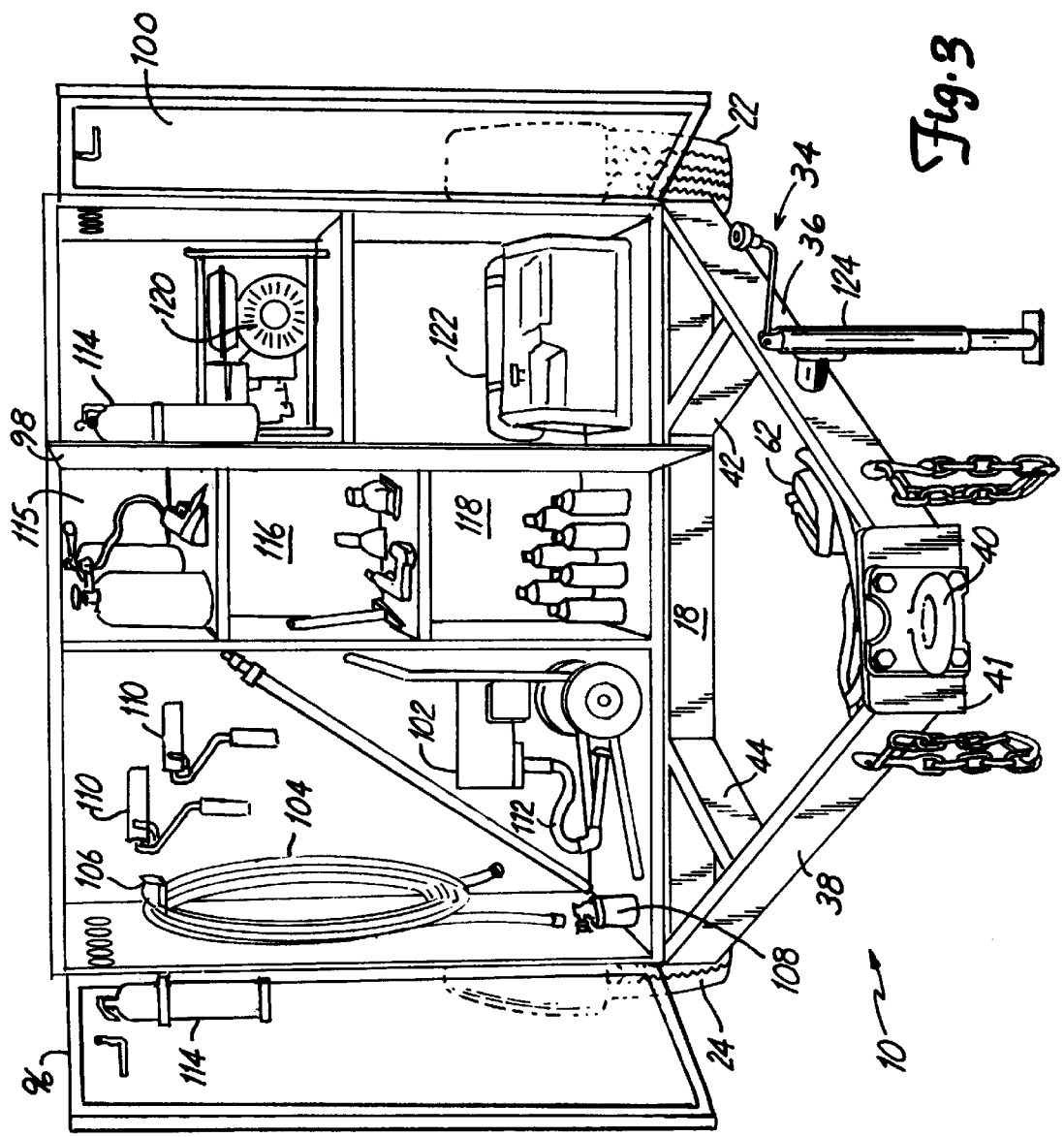
FIG. 3 is front elevation view of the graffiti removal system of FIG. 1.

In order to substantially increase the strength of the trailer frame 12 the preferred embodiment of the invention illustrated herein also has additional longitudinal frame members 30 and 32 as shown in FIG. 2 which are spaced apart from each other substantially equidistantly.

The front of the frame 12 has a tongue assembly 34 attached to it which is made up of tongue members 36 and 38 which are each connected at one end to front transverse member 18 and at the other ends to a pintle receiving member 40. The pintle receiving member 40 is mounted on a hitch support plate 41. The trailer 12 is attached to the hitch of a tractor vehicle (not shown) such as a pickup truck utility vehicle or even a tractor according to the preferences and convenience of the user.

In order to strengthen the trailer 10 a bracing means such as lateral bracing beams 42 and 44 are welded into the tongue assembly 34 between front transverse member 18 and tongue members 36 and 38. Such a bracing means is far stronger than the gussets which are conventionally welded into the junction between tongue members 36 and 38 and transverse frame member 18.

In order to provide the operator of the system 10 with a convenient place to stand, running boards 46 and 48 are provided at the rear of trailer 10. The running boards are supported by the extended portions of the elongated rear transverse member 20 and extend to fenders 26 and 38 respectively. The surface of the running board is non-slip mesh grille and the remainder of the perimeter is supported by box beam segments 50 and 52.

The trailer system 10 has a 150 gallon fluid storage tank 54 mounted with its axis aligned with and positioned generally above axle 25. When used to drive a cold water high pressure washer the tank of water will last approximately one hour when operated at pressures of 2500 to 3000 psi. Tank 54 may be insulated for operation in cold environments. It may also have a tank electric heater to provide hot water at 95 degrees centigrade for a hot water high pressure washer. Additional insulation can also be provided by covering tank 54 with a protective tarpaulin (not shown). Tank 54 has a cap 55 which can be unscrewed to provide access to tank 54 to facilitate filling and cleaning it. The opening is sufficiently large to allow tank 54 to be filled from a fire hydrant or a conventional ⅝ inch or ¾ inch water line or hose. The tank also preferably includes a low water level shutoff (now shown) which protects the power washers from damage as the fluid in tank 54 runs low.

A ⅝ inch hose 55' has one end connected to receive fluid from tank 54 and has the other end connected to a valve 55" to a fitting mounted on rear cabinet 58 which can optionally be connected to a further hose to directly conduct water from tank 54 for drainage purposes.

A forward cabinet 56 and the rear cabinet 58 are used for both the mounting of graffiti removal and surface restoration equipment and the storage and protection of portable graffiti removal and surface restoration equipment and chemicals. A pair or rear doors 63 are hinged at the rear of the cabinet 58 to swing away and completely open cabinet 58 for access. A pair of support hand holds 65 (see FIG. 4) are provided for the operator to grasp when climbing onto running boards 46,48 when the trailer system is stopped and in position for graffiti removal operations.

A spare tire 60 mounts on the front wall of the rear cabinet 58.

A further high pressure hose 59, having a 2" diameter in the embodiment illustrated is connected at one end to tank 54 and at the other end to a t-fitting 59'. A filter 57 is provided for filtering particulate contaminants from water passing through conduit or hose 59 to or from tank 54. A valve 57' is disposed along the hose 59 between an outlet of the tank 54 and the filter 57. From one branch of t-fitting 59; a length of hose 61' is routed through the front wall of cabinet 58 and connected to the fluid input port of pressure washer 64. A length of hose 66 is routed along the rear wall of cabinet 58 to a valve 68 and connector fitting 70 which provides an alternative fill port to fill tank 54 or to provide a direct water line connection from a source of water connected to fitting 70 to the pressure washer 64. Either a hot or cold pressure washer can be used in the system. Of course if a high temperature washer is to be used, provision must be made for heating the water in tank 54. As seen in FIG. 5, the pressure washer 64 provides high pressure water to a washer hose 71 which supplies water to a trigger controlled valve 72 to control the flow of fluid to pressure cleaning wand 73 which can be extended up to 24 feet.

In the preferred embodiment depicted in FIG. 5, a valve 74 or selectably connectable fittings allows connection of a supply tube 75 to a source 76 of cleaning chemicals such as detergents so that cleaning chemicals may be added to the water from the pressure washer 64. Although it is believed preferable to add chemicals to the pressure washer 64 output, it is to be understood that such additives may be incorporated in the tank 54 or the supply line 61', also.

In the preferred embodiment of the invention shown in FIG. 4, the interior of rear cabinet 58 is shown with various parts of the graffiti removal system in their usual positions for transport and use. A 100 foot hose reel 78 is mounted on an arm 80 which is adapted for pivotal movement in bearing support bracket 82 which is mounted on the wall of cabinet 58. When the system has been transported to a work site, arm 80 is pivoted to move reel 78 adjacent the open door of the cabinet so that high pressure hose 84 is readily accessible for connecting the fluid supply tank 54 via the hose 61' to the portable pressure washer 64. In order to facilitate the removal of portable pressure washer 64 from cabinet 58, door center post or door jam 86 is removable from the position shown in FIG. 4 to the position shown in phantom outline.

Also shown in FIG. 4 are two work trays 88 and 90 of cleaning chemicals in spray containers for ready application. I have found that in order to address a broad range of graffiti problems, trays 88 and 90 are best loaded with eight bottles of fluids. Optimally there should be at least one spray bottle of mineral spirits, one of plain water, one of a liquid soap, one bottle of remover "one", one bottle of remover "two" and three bottles of remover "three". Suitable chemicals may be obtained from Trion Tensid AB, Uppsala, Sweden and they are distributed in the United States by Graffiti Solutions, Inc., 2580 White Bear Avenue, Maplewood, Minn. 55109.

A glove holder 92 mounted on the wall of cabinet 58 has a pair of projecting fingers for supporting work gloves 94.

Front cabinet 56 has three doors 96, 98, and 100 to protect three separate storage compartments. In the compartment protected by door 96 are stored an airless paint sprayer 102 and its hose 104 is coiled on a bracket 106 mounted on the side wall of cabinet 56. Sprayer 102 may be used with a cup paint gun 108 or with one of the power rollers 110 which can be connected to sprayer 102 using pole extender 112.

Fire extinguishers 114 are mounted on door 96 and within cabinet 56. In compartment 115 there is a Blast Mo blaster with two pressure tanks. Compartment 116 has a number of specialized fittings for sprayer 102. Compartment 118 may store a plurality of pressure spray cans.

A generator 120 for providing electric power to the airless paint sprayer 102, the lights and other electrically powered apparatus is in the upper right hand compartment protected by door 100. The lower compartment has an air compressor 122.

A storage battery 62, used to operate the electrically actuated trailer brakes (not shown), is mounted on the inside face of the box beam of tongue member 36 to minimize the possibility of some object striking battery 62 as trailer 10 is transported or the system is in use. A jack 124 supports the tongue assembly 34 when the hitch is detached from a towing vehicle.

Other modifications and variations of the system shown as the preferred embodiment may be made without departing from the present invention which is limited only by the claims stated below.

What is claimed is:

1. A system, comprising:
  a longitudinal trailer frame having a front transverse member and a rear transverse member;
  a tongue frame, having a hitch support plate, connected to the trailer frame, the tongue frame including a first tongue member connected between a first end of the front transverse member and the hitch support plate, a second tongue member connected between a second end of the front transverse member and the hitch support plate;
  a fluid storage tank mounted on the trailer frame;
  an axle transversely mounted on the trailer frame, the axle receiving a pair of wheels for supporting and transporting the trailer frame;
  a cabinet mounted on the trailer frame proximate the rear transverse member, the cabinet capable of housing a plurality of working tools including a fluid pressure washer;

a first hose, a first end of the first hose being connectable to an inlet of the pressure washer;

a second hose, a first end of the second hose being connectable to the fluid tank, a second end of the second hose being connectable to a second end of the first hose; and a supply tube for supplying a cleaning material, the supply tube being connectable to a first tube via a valve, the first tube being connected to an outlet of the pressure washer.

2. The system of claim 1, further comprising a third hose, a first end of the third hose being connectable to an external fluid source, and a second end of the third hose being connectable to the second end of the first hose and the second end of the second hose via a t-fitting.

3. The system of claim 2, further comprising a plurality of valves, wherein the first, second and third hoses are controllably in fluid communication therebetween such that the fluid storage tank supplies fluid to the pressure washer via the second and first hoses.

4. The system of claim 2, further comprising a plurality of valves, wherein the first, second and third hoses are controllably in fluid communication therebetween such that the external fluid source supplies fluid directly to the pressure washer via the third and first hoses.

5. A system, comprising:

a longitudinal trailer frame having a front transverse member and a rear transverse member;

a tongue frame, having a hitch support plate, connected to the trailer frame, the tongue frame including a first tongue member connected between a first end of the front transverse member and the hitch support plate, a second tongue member connected between a second end of the front transverse member and the hitch support plate;

a fluid storage tank mounted on the trailer frame;

an axle transversely mounted on the trailer frame, the axle receiving a pair of wheels for supporting and transporting the trailer frame;

a cabinet mounted on the trailer frame proximate the rear transverse member, the cabinet capable of housing a plurality of working tools including a fluid pressure washer;

a first hose, a first end of the first hose being connectable to an inlet of the pressure washer;

a second hose, a first end of the second hose being connectable to the fluid tank, a second end of the second hose being connectable to a second end of the first hose;

a third hose, a first end of the third hose being connectable to an external fluid source, and a second end of the third hose being connectable to the second end of the first hose and the second end of the second hose via a fitting; and a plurality of valves, wherein the first, second and third hoses are controllably in fluid communication therebetween such that the external fluid source fills fluid into the fluid storage tank via the third and second hoses and a first fill port.

6. The system of claim 5, further comprising a supply tube for supplying a cleaning material, the supply tube being connectable to a first tube via a valve, the first tube being connected to an outlet of the pressure washer.

7. The system of claim 5, wherein the fluid storage tank includes a second fill port disposed proximate top of the fluid storage tank.

8. A system, comprising:

a longitudinal trailer frame having a front transverse member and a rear transverse member;

a tongue frame, having a hitch support plate, connected to the trailer frame, the tongue frame including a first tongue member connected between a first end of the front transverse member and the hitch support plate, a second tongue member connected between a second end of the front transverse member and the hitch support plate;

a fluid storage tank mounted on the trailer frame;

an axle transversely mounted on the trailer frame, the axle receiving a pair of wheels for supporting and transporting the trailer frame;

a cabinet mounted on the trailer frame proximate the rear transverse member, the cabinet capable of housing a plurality of working tools including a fluid pressure washer;

a first hose, a first end of the first hose being connectable to an inlet of the pressure washer;

a second hose, a first end of the second hose being connectable to the fluid tank, a second end of the second hose being connectable to a second end of the first hose; and a hose reel mounted on a side wall inside the cabinet, wherein the hose reel has a first end connectable to the first end of the first hose and a second end connected to the inlet of the pressure washer, the hose reel being pivotally mounted on the side wall inside the cabinet.

\* \* \* \* \*